(12) United States Patent
Nijim et al.

(10) Patent No.: US 11,228,414 B1
(45) Date of Patent: Jan. 18, 2022

(54) AUTOMATED COMMUNICATION CHANNEL SELECTION

(71) Applicant: Cox Communications, Inc., Atlanta, GA (US)

(72) Inventors: Yousef Wasef Nijim, Cumming, GA (US); Michael Paul Overcash, Duluth, GA (US); Anthony Joseph Insinga, Powder Springs, GA (US); James Alan Strothmann, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 83 days.

(21) Appl. No.: 16/846,871

(22) Filed: Apr. 13, 2020

(51) Int. Cl.
| | |
|---|---|
| *H04L 5/06* | (2006.01) |
| *H04L 12/24* | (2006.01) |
| *H04L 12/28* | (2006.01) |
| *H04L 29/06* | (2006.01) |
| *H04L 12/751* | (2013.01) |

(52) U.S. Cl.
CPC ............ *H04L 5/06* (2013.01); *H04L 12/2801* (2013.01); *H04L 12/2861* (2013.01); *H04L 41/0896* (2013.01); *H04L 41/12* (2013.01); *H04L 45/02* (2013.01); *H04L 65/4076* (2013.01)

(58) Field of Classification Search
None
See application file for complete search history.

(56) References Cited

U.S. PATENT DOCUMENTS

| | | | | |
|---|---|---|---|---|
| 2008/0013612 | A1* | 1/2008 | Miller | H04L 12/2838 375/224 |
| 2012/0320995 | A1* | 12/2012 | Dabak | H04B 3/54 375/257 |

(Continued)

OTHER PUBLICATIONS

Hunter, Philip, "Standards Groups Unite Over DOCSIS Coexistence with Coax Home Networks", https://www.thebroadcastbridge.com/content/entry/8081/standards-groups-unite-over-docsis-coexistence-with-coax-home-networks, Mar. 20, 2017. (Year: 2017).*

(Continued)

*Primary Examiner* — Faruk Hamza
*Assistant Examiner* — Cassandra L Decker
(74) *Attorney, Agent, or Firm* — Merchant & Gould P.C.

(57) ABSTRACT

Automated communication channel selection is provided. A method, system, and computer readable storage device automatically perform a discovery process of a MoCA® network, to determine a topology of the network, perform a spectrum analysis of a DOCSIS® network of which a portion of the frequency range may be shared, apply one or more business rules to the collected network and spectrum usage data, and determine an optimized channel configuration for transmitting data to end devices in a local network. For example, the channel configuration may be configured for optimal bandwidth allocation, transmission speeds, signal quality, etc., without interferences within the shared frequency spectrum range. A gateway device may include a filter that can be reconfigured as an all-pass filter or as a variable low-pass filter based on the channel configuration determination. The MoCA® network may be reconfigured to operate within a defined frequency range based on the determined channel configuration.

20 Claims, 9 Drawing Sheets

(56) References Cited

U.S. PATENT DOCUMENTS

| | | | |
|---|---|---|---|
| 2013/0035108 A1* | 2/2013 | Joslyn | H04W 24/08 |
| | | | 455/454 |
| 2014/0317294 A1* | 10/2014 | Ramesh | H04L 41/0896 |
| | | | 709/226 |
| 2015/0282189 A1* | 10/2015 | Learned | H04W 16/14 |
| | | | 370/329 |

OTHER PUBLICATIONS

SCTE Standard, SCTE 235 2017, "Operational practice for the coexistence of DOCSIS 3.1 signals and MoCA signals in the home environment", 2017. (Year: 2017).*

* cited by examiner

AUTOMATED COMMUNICATION CHANNEL SELECTION

BACKGROUND

As communications technologies continue to advance, coexistence of various communications channels operating within a shared spectrum may cause bit errors or other performance issues due to interferences. For example, Data over Cable Service Interface Specification (DOCSIS®) is an international telecommunications standard that allows for the addition of high-bandwidth data transfer to an existing coaxial cable TV system. New versions of DOCSIS® may provide increased capacity and more robust modulation for supporting increasing speed and latency requirements. In one example, DOCSIS® 4.0 introduced new spectrum allocations for upstream and downstream channels that enable support of applications that may have high downstream and/or upstream traffic demands, such as sensor networks, virtual/augmented reality, smart cars, etc. While such advancements are advantageous as user demand and emerging technologies require more bandwidth, some spectrum allocations may overlap with frequencies currently used in other applications. For example, Multimedia over Coax Alliance (MoCA®) technology leverages an existing coaxial wiring system inside a premises and previously-unused frequency spectrums to transport high quality, consistent signals for providing increased speed and throughput to connected devices (i.e., MoCA® nodes). However, at least a portion of the previously-unused frequency spectrums used by legacy MoCA® channels may overlap with newly-extended DOCSIS® spectrum allocations. These overlaps may cause interferences, wherein bit errors may occur on a DOCSIS® channel and a MoCA® channel if they transmit concurrently.

Due to the above-described deficiencies and limitations of coexisting communications channels, an alternative technical solution is needed to provide automated communications channel selection for enabling optimized bandwidth allocations, network efficiency, and faster transmission speeds without interferences.

SUMMARY

Aspects of the present disclosure provide a system, method, and computer readable storage device for providing automated communication channel selection. A method, system, and computer readable storage device are described herein that automatically perform a discovery process of a network, such as a MoCA® network, to determine a topology of the network, perform a spectrum analysis of another network of which a portion of the frequency range may be shared, such as a DOCSIS® network, apply one or more business rules to the collected network and spectrum usage data, and determine an optimized channel configuration for transmitting data to end devices in a local network. For example, the channel configuration may be configured for optimal bandwidth allocation, transmission speeds, signal quality, etc., without interferences within the shared frequency spectrum range. A gateway device may include a filter that can be reconfigured as an all-pass filter or as a variable low-pass or band-pass filter based on the channel configuration determination. In some examples, the MoCA® network may be reconfigured to operate within a defined frequency range based on the determined channel configuration.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1A:
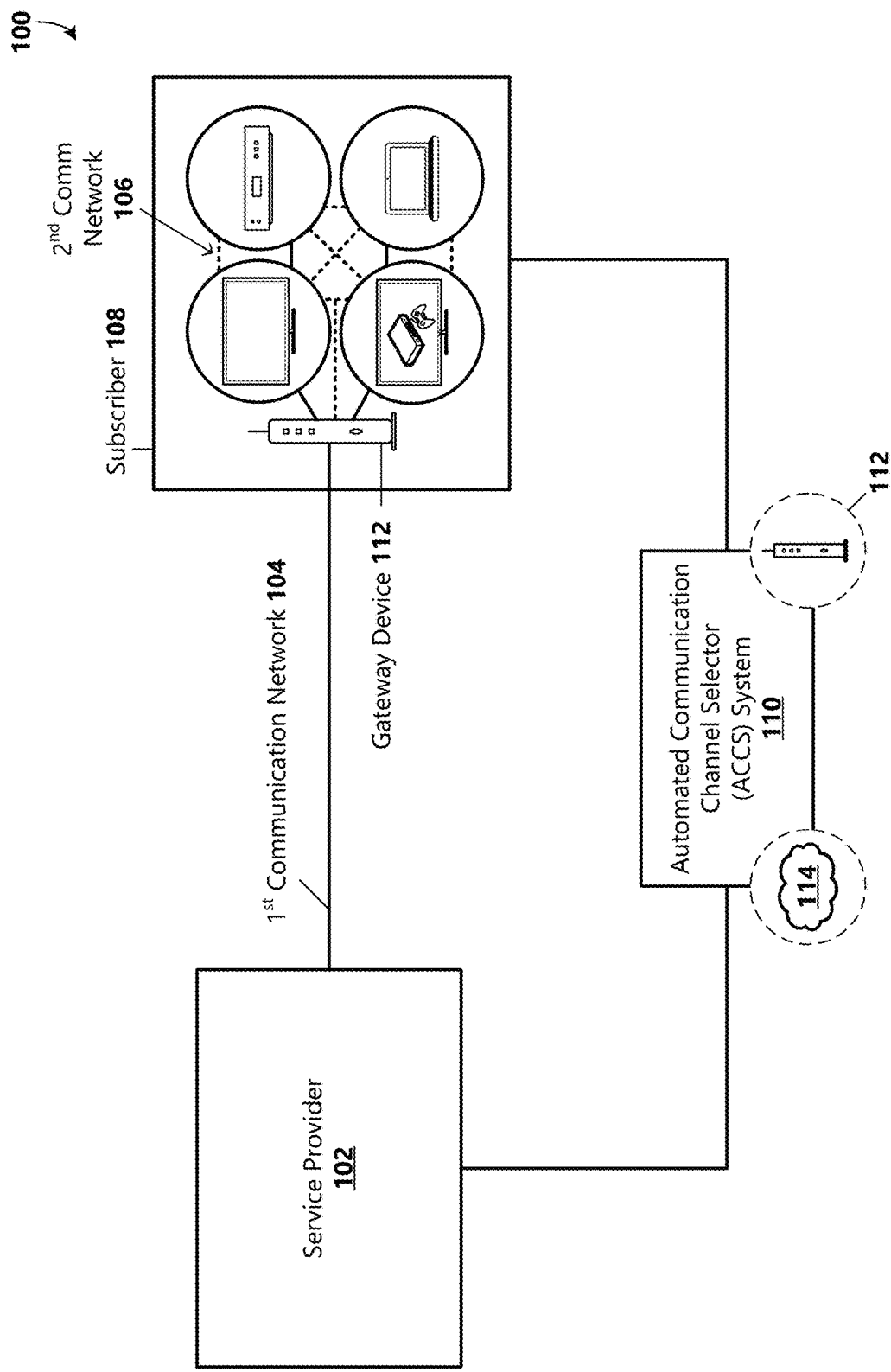
FIG. 1A is a block diagram of an example environment in which a system of the present disclosure can be implemented.

Aspects of the present disclosure enable optimized usage of a shared frequency spectrum by differing signals occupying a same frequency range by providing automated communications channel selection. FIG. 1A is a block diagram of an example environment 100 in which a system of the present disclosure can be implemented. A service provider 102 may provide one or more services (e.g., video, telephony, Internet data) to a plurality of subscribers 108a-n (generally 108) over one or a combination of networks (i.e., first communications network 104). As an example, a service provider 102 may include a cable television (CATV) service provider configured to transmit video and high speed data services over a hybrid fiber coax (HFC) transmission network to a subscriber 108. In example aspects, the service provider 102 system may operate according to a standardized communication protocol, such as a version of the DOCSIS® standard. The standardized communication protocol according to which the service provider 102 operates may define upstream and downstream channels to enable bidirectional communications between the service provider 102 and a subscriber 108.

According to an aspect, the environment 100 may include a gateway device 112 configured to connect the service provider 102 network (i.e., first communications network 104) to a second communications network 106 (e.g., a Local Area Network (LAN), a Wireless Local Area Network (WLAN), a Personal Area Network, or other type of premises network) at the subscriber 108 premises. The gateway device 112 may be configured to support an expanded spectrum version of the standardized communication protocol (e.g., DOCSIS 4.0) used by the service provider 102. For example, the expanded spectrum version may leverage more usable spectrum and include features that may increase data transmission capacity and peak speeds. A gateway device 112 that supports the expanded spectrum version of the protocol may enable higher throughput and speed of communications from the first communications network 104 to the second communications network 106 and from the second communications network 106 to the first communications network 104.

In example aspects, the second communications network 106 may be configured to use MoCA® as a medium to distribute and share high speed data communications among end devices (i.e., MoCA® nodes) at the subscriber 108 premises using existing coaxial wiring in the premises. For example, the gateway device 112 may be MoCA®-enabled and configured to provide an Ethernet delivery service using high-frequency carrier waves, which may be mixed with the service provider signal and transmitted to various devices using premises cabling (e.g., coaxial cables). Accordingly, the second communications network 106 may enable connected devices to form a full mesh peer-to-peer network. As can be appreciated, the second communications network 106, when utilized as a MoCA® network, may deliver reliable, low-lag, and high speed data transmissions that may be advantageous for streaming videos, online gaming experiences, multi-room DVR (Digital Video Recording) use, extending wired and wireless networks, and for enabling other bandwidth-intensive and lag-sensitive applications. According to an aspect, the second communications network 106 operating as a MoCA® network may modulate signals onto high-frequency carrier waves that may overlap at least a portion of the frequency range defined by the standardized communication protocol used by the first communications network 104. Accordingly, differing signals occupying a shared frequency range can cause bit errors due to interferences (e.g., see FIG. 1B).

According to an aspect, the environment 100 may include an automated communication channel selector (ACCS) system 110 configured to automatically determine a channel configuration for first and/or second network communications at the subscriber 108 premises based on the devices connected to the networks and business rules that optimize bandwidth usage and transmission speeds. In some examples, one or more components of the ACCS system 110 may be included in the gateway device 112. In other examples, one or more components of the ACCS system 100 may be included in a separate device local to the second communications network 106 and operatively connected to the gateway device 112. In other examples, one or more components of the ACCS system 100 may operate on a remote server in a distributed network 114, such as the Internet, or on a network device in the service provider network (i.e., first communications network 104). Each component in the example network environment 100 may include one or more computing devices such as servers, workstations, set top boxes, desktop computers, laptop computers, tablets, mobile phones, smart devices, gaming devices, etc., and one or more databases. Further details of the computing devices and variations thereof can be found in FIGS. 5, 6A, 6B, and 7.

Figure 1B:
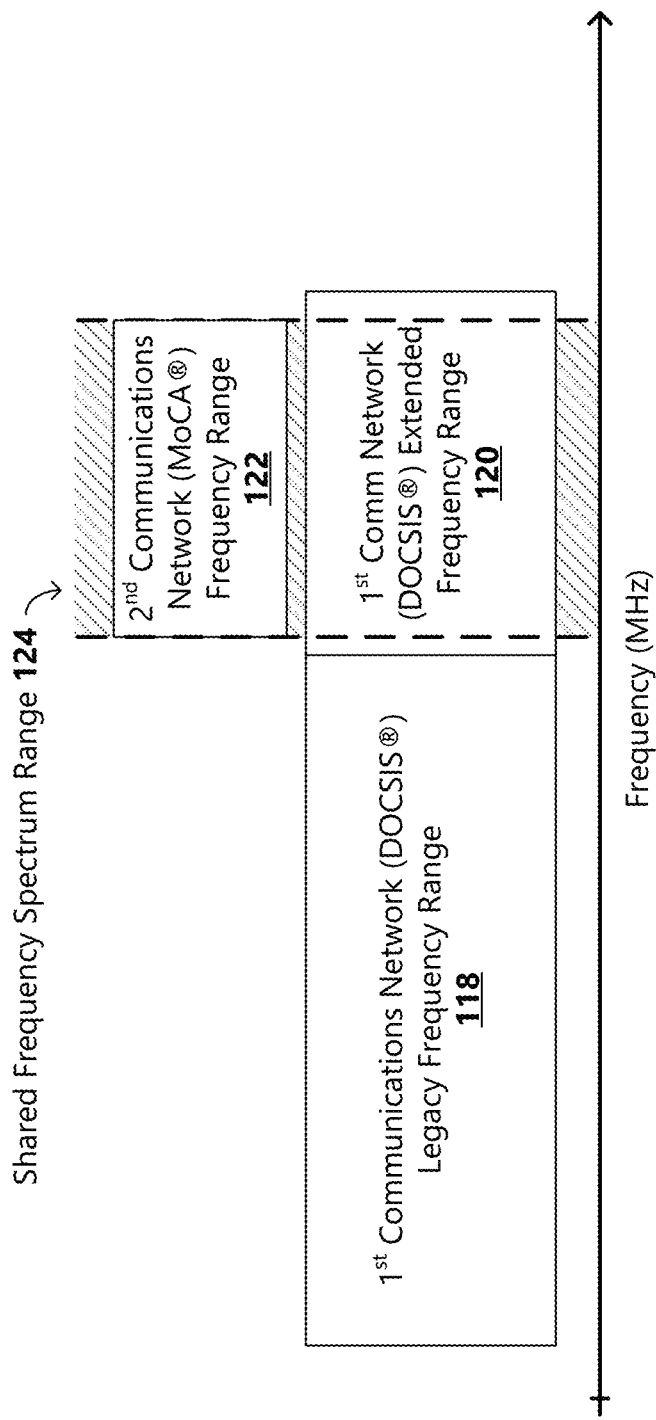
FIG. 1B is a block diagram showing a shared frequency spectrum range between two communications networks.

With reference now to FIG. 1B, a block diagram illustrating a shared frequency spectrum range 124 between the first communications network 104 and the second communications network 106 is provided. Examples may herein refer to DOCSIS® and MoCA® transmissions, and the shared frequency spectrum range 124 may refer to a portion of the frequency spectrum shared by DOCSIS® and MoCA® channels. However, as should be appreciated, aspects may be directed to other diverse communication channels that may share a frequency spectrum range. Based on an earlier version of the standardized communication protocol (e.g., DOCSIS®) used by the service provider 102, the service provider 102 may provide/receive transmissions of data within a legacy frequency range 118 that does not overlap with the second communications network frequency range 122 defined by the standardized communication protocol (e.g., MoCA®) used for the second communication network 106. For example, the MoCA® protocol may define certain frequencies as being assigned to MoCA® channels. However, as newer versions of DOCSIS® are developed to meet demands of subscribers 108, the service provider 102 may extend their use of the RF spectrum into an extended frequency range 120. This extended frequency range 120 may create a shared frequency spectrum range 124 that may cause conflicts with some of the MoCA® channels in the second communications network frequency range 122. Aspects of the ACCS system 110 are configured to reduce and/or prevent interferences within the shared frequency spectrum range 124 while optimizing transmission speeds and increased bandwidth offered by the technologies of the first communications network 104 and the second communications network 106.

Figure 2:
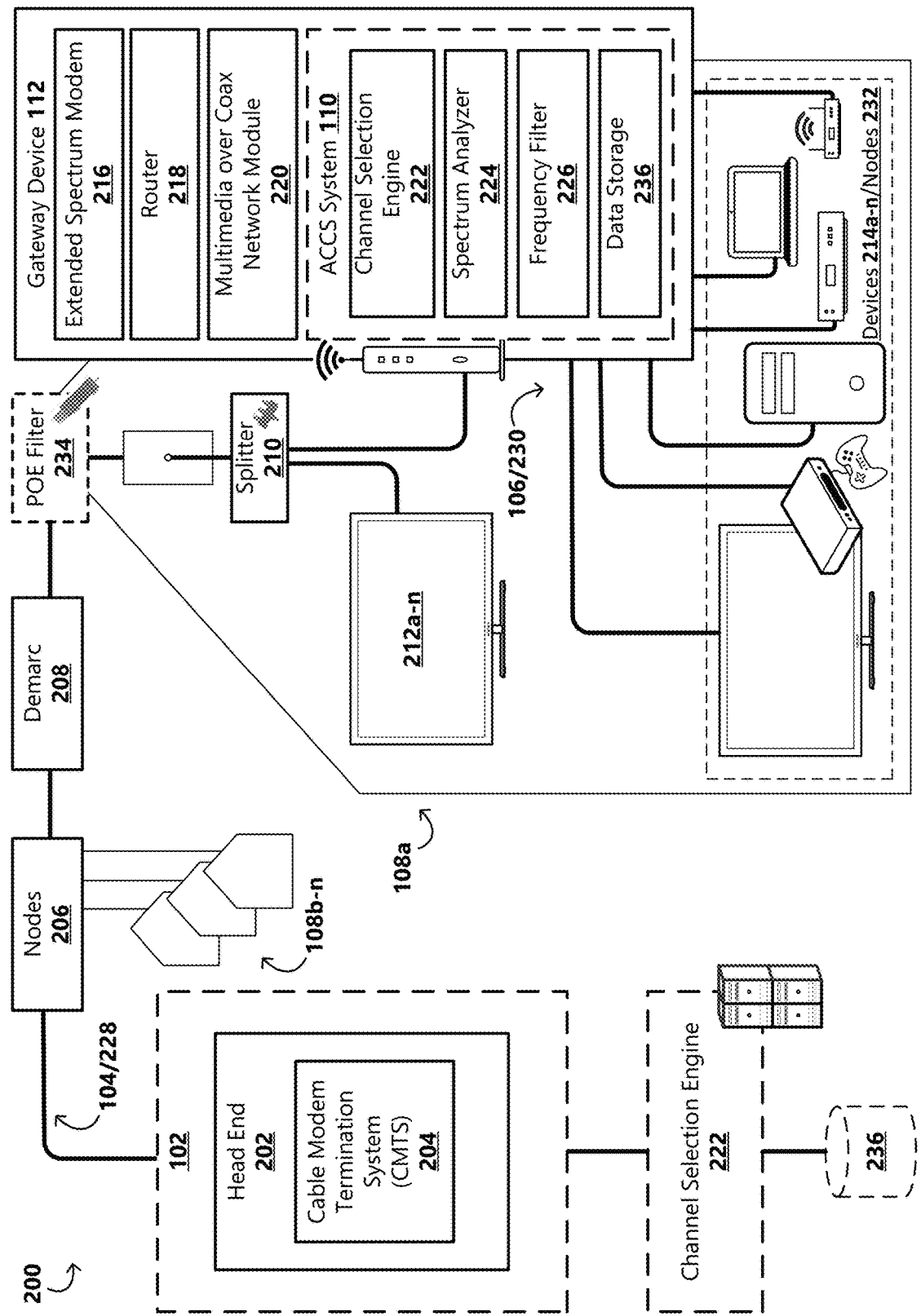
FIG. 2 is a block diagram showing components of an example automated communications channel selector system according to an embodiment.

FIG. 2 is a conceptual illustration 200 of the first communications network 104 embodied as an example HFC network 228 in which an example embodiment of the ACCS system 110 may operate for identifying potential interferences within a shared frequency spectrum range 124 and determining and assigning optimized communications channels to prevent interferences. As should be understood by those skilled in the art, one or more of the components included in the ACCS system 110 can be integrated or provided in any combination of separate systems, wherein FIG. 2 shows only one example. The HFC network 228 may extend from a head end 202 of the service provider 102 to a plurality of nodes 206, where each node serves a plurality of subscribers 108a-n. For example, each node 206 may serve 200 to 1,000 subscribers within a service area, where the subscribers may subscribe for residential and/or business services.

The service provider 102 may use a cable modem termination system (CMTS) 204 located within the head end 202 to provide high speed data services such as cable Internet, among other similar services, to the various sets of subscribers 108a-n. For example, the CMTS 204 may encode, modulate, and upconvert one or more of the services onto radio frequency (RF) carriers, combine the RF carriers into a single electrical signal, and insert the electrical signal into a broadband optical transmitter. The broadband optical transmitter may convert the electrical signal to a downstream optically modulated signal that is sent to one or more of the nodes 206 over one or more fiber optic cable lines.

Each node 206 may include a broadband optical receiver to convert the downstream optically modulated signal to an electrical signal (e.g., translate the signal from a light beam to RF). The node 206 may send the electrical signal over one or more coaxial cable lines to a gateway device 112 of a subscriber 108a (generally 108) serviced by the node 206.

Each subscriber 108 within a set of subscribers may have at least one gateway device 112. In some examples, RF amplifiers may be placed at intervals along the coaxial cables lines to overcome cable attenuation and passive losses of the electrical signal caused by splitting or tapping the coaxial cables lines. Upon receipt of the electrical signal, a modem, such as an extended spectrum modem 216 included in the gateway device 112 may demodulate the electrical signal in order to deliver the services to one or more devices 214 of the subscriber 108, including desktop computers, laptop computers, mobile phones, tablets, gaming devices, televisions, among other examples. The HFC network 228 may operate bi-directionally, whereby signals are transmitted in both downstream and upstream directions. For example, downstream signals may transmit data from the head end 202 to the gateway device 112 via the respective node 206. The data transmitted in the downstream signals may include content associated with the one or more services being provided, such as video content, voice data, and Internet data, among other examples. The upstream signals may transmit data from the gateway device 112 to the head end 202 via the node 206.

According to an aspect, the service provider 102 may be configured to use an extended frequency range 120 (e.g., above 1 GHz) to provide data to one or more subscribers 108. Accordingly, in some examples, a subscriber 108 may utilize the extended spectrum modem 216 in support of the extended frequency range 120. For example, the extended spectrum modem 216 may be a modem device or component configured to interoperate with the HFC network 228 and further configured to use the extended frequency range 120 (e.g., operate with an upper downstream frequency of 1 GHz, 1.8 GHz, or 3.0 GHz with low/mid/high splits per an updated version of the standardized communication protocol (e.g., DOCSIS®) used by the service provider 102) for data transmissions. In some examples and as illustrated, the extended spectrum modem 216 may be included in the gateway device 112. In some examples, the gateway device 112 may further include a router 218 operatively connected to the extended spectrum modem 216 that enables various connected devices 214 to join a same local network (e.g., second communications network 106) and to connect to the HFC network 228. In other examples, the router 218 may be a separate standalone device. The router 218 may be further configured to connect devices 214 to the local network wirelessly (e.g., provide a wireless network).

In some examples, the gateway device 112 may further include or be operatively connected to a multimedia over coaxial network module (herein referred to as a MoCA® module) 220 operative or configured to support MoCA® features in association with utilizing a coaxial cable network within the subscriber 108 premises to broadcast signals to connected devices 214 within a defined second communications network frequency range 122 as defined by MoCA® standards. For example, the local network (i.e., second communications network 106) may be configured as a MoCA® network 230 in which devices 214/MoCA® nodes 232 are networked together in a MoCA® architecture using MoCA® technology, wherein the MoCA® module 220 may be configured to provide an Ethernet delivery service using high-frequency carrier waves within a defined MoCA® frequency range 122 (e.g., frequencies between 1.125 GHz and 1.225 GHz), which may be mixed with the service provider signal and transmitted to various devices using coaxial cables. As described above, the second communications network frequency range 122 may overlap a portion of the first communications network extended frequency range 120. To prevent interferences within the shared frequency spectrum range 124, the ACCS system 110 may be utilized.

According to an aspect, the ACCS system 110 may include a channel selection engine 222, a spectrum analyzer 224, a frequency filter 226, and data storage 236. In some examples, one or more of the components of the ACCS system 110 may be combined. In other examples, one or more of the components of the ACCS system 110 may be provided in any combination of separate systems, which in some examples may include remote (e.g., cloud) systems. For example, in an example embodiment, the channel selection engine 222 may be a cloud-based engine that may be utilized by a plurality of gateway devices 112 of a plurality of subscribers 108.

The channel selection engine 222 is illustrative of a software application, module, or computing device operative or configured to determine channel configuration settings for DOCSIS® and/or MoCA® communications based on spectrum utilization data, network topology data, and one or more sets of business rules, and to provide the determined channel configuration settings to the frequency filter 226, and/or the MoCA® module 220 for configuring DOCSIS® and/or MoCA® channels for optimizing utilization and performance of the local network 106. In some examples, as part of determining channel configuration settings, the channel selection engine 222 may be configured to access previously-obtained and/or machine-learned network, device, usage, and spectrum usage information stored in data storage 236 and/or use the spectrum analyzer 224 to scan for frequencies used and the types of networks used (e.g., upstream frequencies, downstream frequencies, video frequencies, metadata frequencies, WiFi 8 frequencies, Zigbee® frequencies, IoT frequencies, or other info that is submitted over a frequency range or band).

In some examples, the channel selection engine 222 includes, is configured as, or is operatively connected to a machine learning engine that uses machine learning capabilities to learn about the configuration of the local network, including information about the gateway device 112, the MoCA® nodes 232 connected to the network, and in some examples, connected devices 214 provisioned by the service provider 102 and associated with the subscriber's account. For example, information about the gateway device 112 may include the protocol(s) used, security type, network band and channel information, MAC address, the version of DOCSIS®, the version of MoCA® supported, etc. In some examples, information about the MoCA® nodes 232 may include identifications (e.g., MAC addresses, IP addresses) and types of MoCA® nodes 232 that are on the network, the version of MoCA® (i.e., which MoCA® protocol(s)) that the nodes support, modulation type used, the MoCA® frequency spectrum range 122 usages by the nodes, data rates and signal strengths between MoCA® nodes 232 (which may vary depending on the physical characteristics of the path between the transmit and receive nodes), hardware version information, software version information, etc.

In some examples, the channel selection engine 222 is further configured to machine-learn data usage behaviors (e.g., usage of a particular delivery network, amount of usage, time of usage). For example, the channel selection engine 222 may store network configuration data and usage data in data storage 236, and the machine learning engine may analyze the stored data for learning the network topologies and usage behaviors (e.g., usage of a subscriber, usage of a plurality of subscribers on a same node 206, usage of different devices 214) for determining various use cases and channel configurations that optimize use of the DOCSIS® extended spectrum range 120 and the MoCA® spectrum range 122. Accordingly, the channel selection engine 222 can make channel configuration selections based at least in part on machine-learned network information, usage behaviors, and various business rules. In some examples, the machine learning engine may be configured to identify problems shared across a node 206. For example the spectrum analyzer 224 may detect interference at a particular frequency for multiple devices on the node 206. Some examples of business rules and channel configuration setting determinations based on device and spectrum utilization and business rules are described below.

In some examples, the channel selection engine 222 may be configured to trigger a first discovery process for determining whether there are MoCA® nodes 232 operating on the local network (i.e., second communications network 106) and, if so, information about the MoCA® nodes. As part of triggering the first discovery process, the channel selection engine 222 may be configured to instruct the frequency filter 226 to filter extended spectrum frequencies, instruct the MoCA® module 220 to broadcast a MoCA® beacon signal (e.g., at 1.15 GHz or other frequency), and instruct the spectrum analyzer 224 to start a scan. Frequency usage data measured by the spectrum analyzer 224 and MoCA® beacon acknowledgment data (if any) may be provided to and received by the channel selection engine 222. The channel selection engine 222 may be configured to store received data in the data storage 236. In some examples, the data storage device 236 may be configured to store various data, including network and device information associated with a subscriber premises, such as information of the devices 214, frequency utilization information and channels used, filter coefficients for enabling, disabling, or otherwise configuring the frequency filter 226, information about a presence of a Point of Entry (POE) filter 234, etc.

In some examples, if the frequency usage data indicate that there are no signals in the MoCA® frequency range 122 and/or if no MoCA® beacon acknowledgments are received, a determination may be made that there are no MoCA® nodes 232 operating on the local network, and a second discovery process may not be performed. In some examples, when a determination is made that there are no MoCA® nodes 232 operating on the local network, the channel selection engine 222 may be further configured to instruct the MoCA® module 220 to be disabled/deactivated, which may allow for the full extended DOCSIS® spectrum 120 to be used on the local network.

In some examples, if there the frequency usage data and/or MoCA® beacon acknowledgments indicate that there are MoCA® nodes 232 operating on the local network, a second discovery process (i.e., a DOCSIS® discovery process) may be performed. As part of the second discovery process (i.e., a DOCSIS® discovery process), the channel selection engine 222 may be configured to instruct the MoCA® module 222 and MoCA® nodes 232 to halt transmissions for a time period (e.g., 60 seconds), instruct the frequency filter 226 to allow all frequencies to pass through, and instruct the spectrum analyzer 224 to start a scan (e.g., of upstream frequencies, downstream frequencies, video frequencies, metadata frequencies, WiFi® frequencies, Zigbee® frequencies, IoT frequencies, or any other info that is submitted over a frequency range or band). Frequency usage data measured by the spectrum analyzer 224 may be provided to and received by the channel selection engine 222. The channel selection engine 222 may be configured to store received data in the data storage 236.

According to an aspect, the channel selection engine 222 may be further configured to analyze the data collected during the first discovery process and the second discovery process and machine-learned usage behavior, apply one or more business rules, and based on the collected and learned data, determine frequency usage and channel configurations that optimize network utilization (e.g., optimize bandwidth allocation, increase transmission speeds, increase signal quality, etc., without interferences within the shared frequency spectrum range).

According to an aspect, the frequency filter 226 is configurable based on instructions from the channel selection engine 222, wherein the instructions are associated with a channel configuration determination made by the channel selection engine 222 based on network topology data associated with the local network 106, the spectrum analysis data, machine-learned topology and utilization data, and business rules. In some examples, the frequency filter 226 may be configured as an all-pass filter that enables all frequencies (e.g., access network signals within the legacy DOCSIS® frequency range 118 and the extended frequency range 120) to be passed to the devices 214 connected to the gateway device 112. For example, this configuration may be determined when there are no MoCA® nodes 232 operating on the local network 106. In some examples, the frequency filter 226 may be configured as a low-pass or band-pass filter that limits certain DOCSIS® channels (e.g., within the shared frequency spectrum range 124) from being used that may interfere with a MoCA® channel operating within the shared frequency spectrum range 124. For example, these configurations may be determined to enable usage of the DOCSIS® extended frequency range 120 and the MoCA® frequency range 122.

The spectrum analyzer 224 is illustrative of a software application, module, or computing device operative or configured to listen for and measure signals as part of the first discovery process for determining the spectrum utilization of the MoCA® network and the second discovery process for determining the spectrum utilization of the DOCSIS® spectrum, and to provide the spectrum utilization data to the channel selection engine 222. The discovery processes and determinations made by the channel selection engine 222 are described further below with reference to FIGS. 3A and 3B.

In some examples, a POE filter 234 may be installed at the subscriber 108 premises to prevent MoCA® signals from escaping and entering other subscribers' premises. While the POE filter 234 may be useful for this purpose, the POE filter can be undesirable for utilization of the extended DOCSIS® frequency range 120. Accordingly, in some examples, the spectrum analysis data may include information that can be analyzed for determining whether a POE filter 234 is installed at the subscriber 108 premises. In some example, the spectrum analysis data may be analyzed for determining whether attenuated signals in the MoCA® range (e.g., above 1 GHz) are observed or not. For example, if the CMTS 204 is known to emit energy above 1 GHz and if this energy is not observed at the spectrum analyzer, a determination may be made that a POE filter 234 is present. In some examples, the channel selection engine 222 may be configured to determine, based on the spectrum analysis data, whether the POE filter 234 is installed, and if the POE filter 234 is installed, to generate a notification to the service provider 102 to remove the POE filter 234.

Figure 3A:
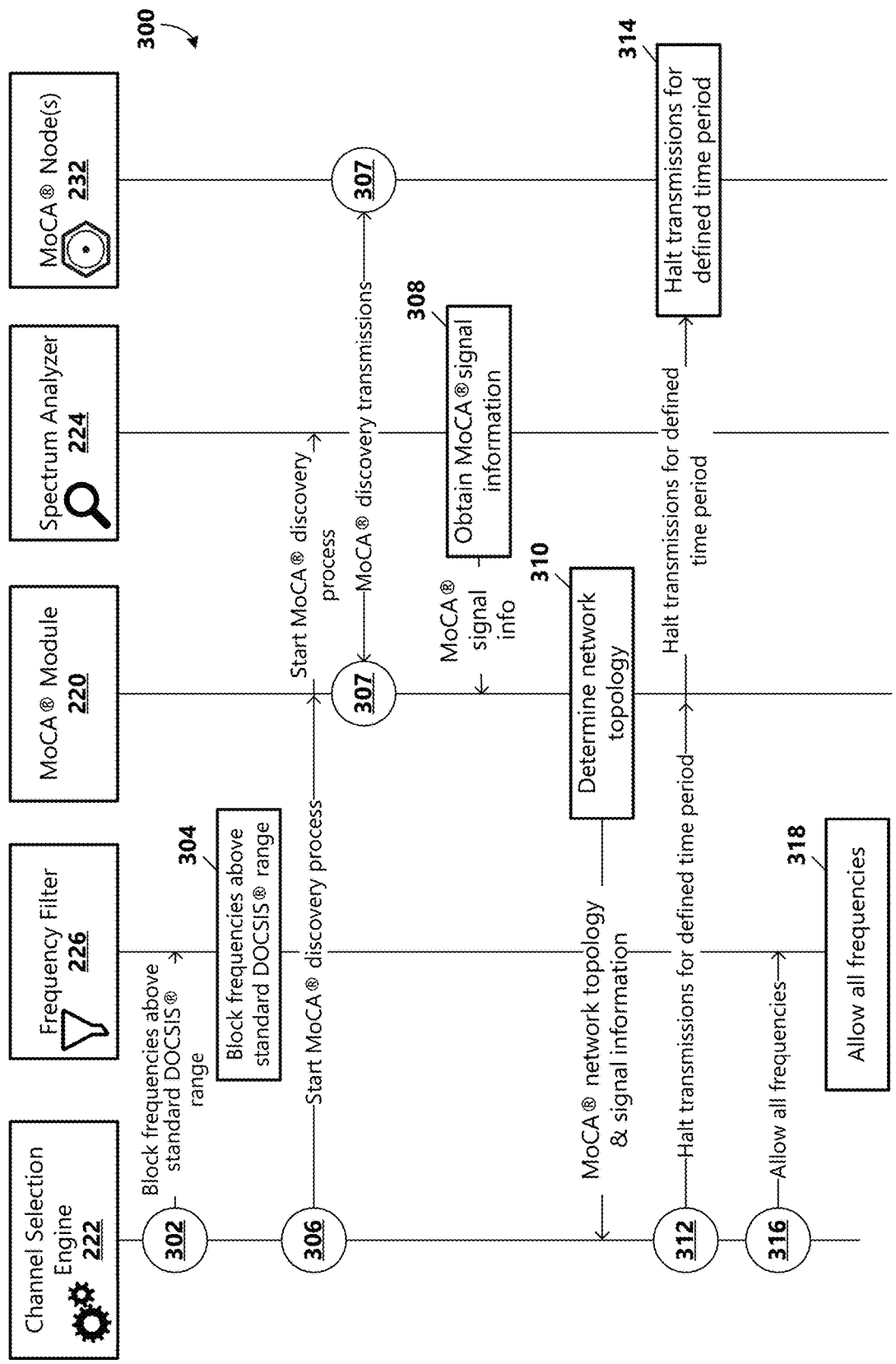
FIGS. 3A-B are a sequence diagram showing an example sequence of steps and communications performed as part of providing automated communications channel selection according to an embodiment.

With reference now to FIG. 3A, a sequence diagram 300 is provided that shows an example sequence of communications and operations performed as part of providing automated communications channel selection according to an embodiment. COMMUNICATION 302 represents instructions provided by the channel selection engine 222 to the frequency filter 226 to initiate the first discovery process to determine MoCA® frequency usage and a network topology of the second communications network 106. According to an aspect, COMMUNICATION 302 includes instructions to block frequencies of communications received from the first communications network 104 (e.g., HFC network 228) that are above a particular cutoff frequency. In some examples, the particular cutoff frequency is associated with a starting point of the first communications network extended frequency range 120 (e.g., 1 GHz). In other examples, the particular cutoff frequency is associated with a starting point of the shared frequency spectrum range 124 (i.e., frequency spectrum range shared by the extended frequency range 120 and the MoCA® frequency range 122).

The channel selection engine 222 may send COMMUNICATION 302 on a periodic basis or in response to a triggering event, such as one or more of: when a new installation of service and/or a gateway device 112 is provided to a subscriber 108, when a new MoCA® node 232 is discovered (e.g., added to the MoCA® network), when a MoCA® node 232 is removed from the MoCA® network, an actuation of a button on the gateway device 112, a user command received via a user interface (UI) provided by the gateway device 112, an instruction from the service provider head end 202 (which may be associated with a subscription or billing change, as part of a self-installation procedure, or other triggering event), etc.

OPERATION 304 represents an operation performed by the frequency filter 226 in response to COMMUNICATION 302. For example, at OPERATION 304, the frequency filter 226 may allow frequencies received via the first communications network 104 that are below the cutoff frequency to pass and block frequencies above the cutoff frequency. Accordingly, the communications received via the first communications network 104 that are within the shared frequency spectrum range 124 (with the second communications network 106) may be filtered to prevent possible interferences during the discovery process. For example, communications received via the HFC network 228 that are within at least a portion of the first communications network extended frequency range 120 may be blocked to prevent possible interferences with MoCA® transmissions on the local network.

COMMUNICATION 306 represents instructions provided by the channel selection engine 222 to the MoCA® module 220 to initiate a first discovery process for discovering MoCA® nodes 232 and obtaining network topology data in association with the MoCA® network 230. COMMUNICATION 306 may further represent instructions provided by the channel selection engine 222 to the spectrum analyzer 224 to perform a scan of the second communications network 106 for obtaining spectrum utilization data associated with MoCA® frequencies utilized. In some examples, as part of instructing the MoCA® module 220 to initiate the first discovery process, the channel selection engine 222 may access information stored in the data storage device 236, such as previously-obtained network and device information, identify devices 214 associated with the subscriber's account, and instruct the MoCA® module 220 to attempt to communicate with the identified devices in order to determine if the devices are MoCA® capable.

In some examples, as part of the first discovery process, the MoCA® module 220 may be instructed to initiate a MoCA® node discovery process, where the MoCA® module 220 may transmit beacon messages for discovery. For example, beacon messages may be transmitted on a particular beacon channel, and MoCA® nodes 232 receiving a beacon message may transmit a message to the MoCA® module 220 in response to the beacon message. In some examples, the response messages include information about the MoCA® nodes 232 and specify attributes of the traffic flow between nodes, which can be used (e.g., by the MoCA® module 220 and/or the channel selection engine 222) to determine the MoCA® network topology. OPERATION 307 represents communications (e.g., beacon and response messages) between the MoCA® module 220 and the MoCA® nodes 232 as part of the MoCA® node discovery process.

OPERATION and COMMUNICATION 308 represent measurements made by the spectrum analyzer 224 of frequency range usages and a communication of the frequency range usage measurements to the MoCA® module 220.

OPERATION and COMMUNICATION 310 represent a network topology determination made by the MoCA® module 220 and a communication of the network topology determination to the channel selection engine 222. In some examples, the network topology determination includes a determination about the topology of the MoCA® network 230, such as identifications (e.g., MAC addresses, IP addresses) and types of MoCA® nodes 232 that are on the network, the version of MoCA® (i.e., which MoCA® protocol(s)) that the nodes support, modulation type used, the MoCA® frequency spectrum range 122 usages by the nodes, data rates and signal strengths between MoCA® nodes 232 (which may vary depending on the physical characteristics of the path between the transmit and receive nodes), hardware version information, software version information, etc. In some examples, the channel selection engine 222 may store the network topology data in data storage 236. In some examples, if no MoCA® nodes 232 are detected, OPERATIONS AND COMMUNICATIONS 312-334 may be omitted, and the full DOCSIS® spectrum 120 may be utilized.

COMMUNICATION 312 represents instructions provided by the channel selection engine 222 to discovered MoCA® nodes 232 to halt transmissions for a defined time period. In some examples, the defined time period may be a set time period (e.g., 60 seconds, 2 minutes). In other examples, the defined time period may be a time period until a subsequent communication is received from the gateway device 112.

OPERATION 314 is representative of each of the MoCA® nodes 232 halting transmissions for the defined time period responsive to receiving COMMUNICATION 312.

COMMUNICATION 316 represents instructions provided by the channel selection engine 222 to the frequency filter 226 to allow all frequencies to pass.

OPERATION 318 represents the frequency filter 226 reconfiguring as an all-pass filter to allow all frequencies (e.g., access network signals within the legacy DOCSIS® frequency range 118 and the extended frequency range 120) to be passed to the devices 214 (including MoCA® node(s) 232 connected to the gateway device 112.

Figure 3B:
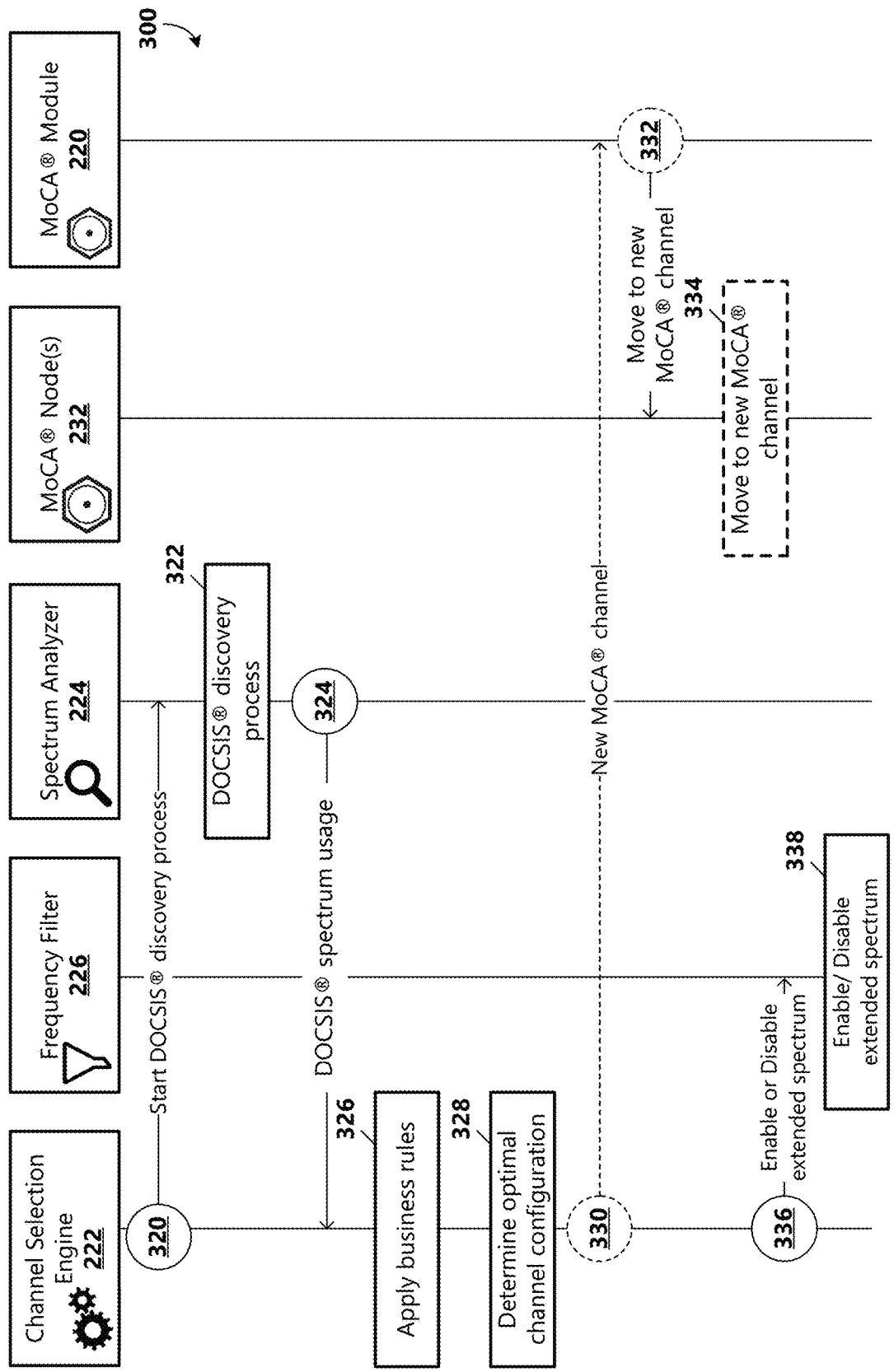

The sequence diagram 300 continues to FIG. 3B. With reference now to FIG. 3B, COMMUNICATION 320 represents instructions provided by the channel selection engine 222 to the spectrum analyzer 224 to perform a second discovery process. For example, the instructions may be a trigger to perform a scan for obtaining signal information associated with DOCSIS® frequency usage.

OPERATION 322 represents a spectrum analysis function performed by the spectrum analyzer 224 where the spectrum analyzer 224 may scan across all or defined frequencies ranges and detect and measure the RF signals.

COMMUNICATION 324 represents a message provided by the spectrum analyzer 224 to the channel selection engine 222 including an output of the spectral analysis of the DOCSIS® legacy 118 and extended frequency range 120. For example, the DOCSIS® extended frequency range 120 includes at least a portion of the shared frequency spectrum range 124, and the spectral analysis output may indicate DOCSIS® spectrum usage within the extended frequency range 120. In some examples, the channel selection engine 222 may store the spectral analysis data in data storage 236.

OPERATION 326 represents a process performed by the channel selection engine 222 where the channel selection engine 222 analyzes the MOCA® topology data and DOCSIS® spectral usage data received in COMMUNICATIONS 310 and 324 and applies one or more business rules to the data. According to an aspect, the channel selection engine 222 may analyze the network topology data and apply the business rules for automatically selecting frequency filter 226 settings in association with desired frequency usage for DOCSIS® and/or MoCA® signals based on the MoCA® nodes 232 in the local network, usage of the MoCA® frequency range 122 and the DOCSIS® extended frequency range 120, and the one or more business rules. The one or more business rules may be associated with decisions based on network rules, router rules, modem rules, CMTS 204 rules, and/or headend 202 rules.

OPERATION 328 represents a channel configuration determination made by the channel selection engine 222 based on one or more business rules. In some examples, the channel configuration determination may include one of: a determination to use the full DOCSIS® extended frequency range 120 for content delivery to end devices 214 and to halt MoCA® frequencies; a determination to enable a transmission of MoCA® signals using one or more channels that utilize frequencies above a starting point of the DOCSIS® extended frequency range 120 and to block a transmission of DOCSIS® signals in the extended frequency range 120 (i.e., use the legacy frequency range 118); or to enable a transmission of MoCA® signals in the MoCA® frequency range 122 and to allow transmissions of DOCSIS® signals to operate within the legacy frequency range 118 and a portion of the extended frequency range 120 using one or more channels that utilize frequencies outside of the MoCA® frequency range 122. The channel configuration determination may provide for frequency selections that enable optimal usage of the DOCSIS® extended frequency range 120 and, if applicable, the MoCA® frequency range 122 and also avoid conflicting communications within the shared frequency spectrum range 124. In some examples, the channel configuration determination may be associated with a fixed channel configuration that is used by the gateway device 112 until a subsequent channel configuration determination is made responsive to a triggering event, such as a predetermined time period, a billing or subscription change, a new MoCA® node 232 is discovered on the MoCA® network 230, a new gateway device 112 is installed, etc. In other examples, the channel configuration determination may be associated with a channel configuration for a particular use (e.g., the determination is made as the subscriber uses connected devices 214 and/or MoCA® nodes 232.

According to an aspect, the one or more business rules may be associated with network rules, router rules, modem rules, CMTS 204 rules, and/or headend 202 rules. In some examples, the business rules may be stored locally (on the gateway device 112) or in cloud-based data storage 236, and may be accessed by the channel selection engine 222. In one example, a business rule may be configured to provide a certain channel configuration that provides for higher bandwidth to be provided to particular tiers of subscribers 108 (e.g., a tier associated with a subscription that includes extended spectrum services). Accordingly, the channel selection engine 222 may be operative to query the head end 202 or a data services system for subscriber account information for making a channel configuration determination. For example, if the subscriber 108 does not have a subscription that includes extended spectrum services, the channel configuration determination may restrict usage of the DOCSIS® extended frequency range 120. As another example, if a subscriber 108 is streaming video content, the channel selection engine 222 may make a channel configuration selection that uses the MoCA® network 230 to deliver the video content to a MoCA® node 232 using at least a portion of the MoCA® frequency range 122 for delivery. After streaming the video content, the channel configuration selection may include a determination to switch to a different downstream frequency band or channel to allow for higher bandwidth.

As another example, the channel configuration determination may be an instruction for MoCA® nodes 232 to work on a particular selected channel (e.g., a channel not used by DOCSIS® expanded spectrum signals) rather than selecting channels automatically. As another example, the channel configuration determination may be made to, if the MoCA® nodes 232 are not affiliated with the service provider 102, not allow MoCA® transmissions and to enable extended frequency usage. As another example, the channel configuration determination may be to enable or disable the extended spectrum based on the delivery network and/or based on usage. For example, if, based on the MoCA® discovery process, MoCA® nodes 232 are identified that are connected to the network but the subscriber is not using video, to provide higher bandwidth, the channel configuration determination may be to switch off MoCA® transmissions to allow for the higher bandwidth at certain time.

As another example scenario where a channel configuration determination is made based on business rules, consider that a subscriber may be provisioned for Extended Spectrum DOCSIS® service; however the spectrum analyzer scan may show no energy above 1 GHz. Accordingly, a determination may be made that a POE filter 234 is likely in place. Based on a business rule, a determination may be made to temporarily move the subscriber to a legacy DOCSIS® service (i.e., instruct the frequency filter 226 to block extended spectrum frequencies) and to schedule a service call to remove the POE filter 234.

As another example scenario where a channel configuration determination is made based on business rules, consider that a subscriber may purchase services which may rely on MoCA® delivery. However, after telling the other MoCA® nodes to be silent as part of the first discovery process, energy may be detected above 1 GHz. Based on a business rule, a determination may be made to disable the MoCA®-related services until a service call occurs.

As another example scenario where a channel configuration determination is made based on business rules, consider that a subscriber may purchase services which rely on Extended Spectrum DOCSIS® service and MoCA® service. The spectrum analyzer 224 may detect energy in the shared frequency band 124, as expected. Based on a business rule, a determination may be made to change the MoCA® channel to a non-conflicting one. For example, the determination may include an instruction to configure the programmable frequency filter 226 to initially block the DOCSIS® extended spectrum range 120 to allow an initial MoCA® network. Then after the MoCA® nodes 232 are reconfigured to operate on a specific channel(s), the frequency filter 226 may be configured to stop blocking DOCSIS® extended spectrum range signals. As should be appreciated, other channel configuration determination made based on business rules are possible and are within the scope of the present disclosure.

COMMUNICATION 330 represents a communication of the channel configuration determination to the MoCA® module 220. For example, if the channel configuration determination includes a determination to configure the MoCA® module 220 to produce MoCA® format signals within a particular frequency band, range of frequencies, or particular channel, COMMUNICATION 330 may include instructions to move MoCA® communications to the particular frequency band, range of frequencies, or channel. As another example, if the channel configuration determination includes a determination to not use the MoCA® network 230, COMMUNICATION 330 may include instructions to halt MoCA® transmissions.

OPERATION 332 represents the MoCA® module 220 establishing communications with MoCA® nodes 232 at a particular frequency to provide a notification message that instructs the nodes to operate within the particular frequency band, range of frequencies, or channel associated with the channel configuration determination. For example, the channel configuration determination may be utilized to intelligently move MoCA® transmissions to a different channel that does not interfere with extended spectrum channels.

OPERATION 334 represents the MoCA® nodes 232 reconfiguring to operate within the particular frequency band, range of frequencies, or channel associated with the channel configuration determination. For example, the MoCA® nodes 232 may be reconfigured to: not dynamically select another channel from which to operate and operate from the selected channel(s) associated with the channel configuration determination, wherein the selected channel(s) do not interfere with DOCSIS® signals in the extended frequency range 120.

COMMUNICATION 336 represents a communication of the channel configuration determination to the frequency filter 226. In some examples, the channel configuration determination may include a determination to configure the frequency filter 226 as an all-pass filter that enables all frequencies (e.g., access network signals within the legacy DOCSIS® frequency range 118 and the extended frequency range 120) to be passed to the devices 214 connected to the gateway device 112. For example, this determination may be associated with a determination to not use the MoCA® network 230 or to use a portion of the MoCA® frequency range 122 that does not overlap the DOCSIS® extended frequency range 120. In other examples, the channel configuration determination may include a determination to configure the frequency filter 226 as a low-pass or band-pass filter that limits certain DOCSIS® channels (e.g., within the shared frequency spectrum range 124) from being used that may interfere with a MoCA® channel operating within the shared frequency spectrum range 124.

OPERATION 338 represents an operation performed by the frequency filter 226 in response to COMMUNICATION 336 to configure itself as an all-pass filter, a low-pass, or a band-pass filter based on the channel configuration determination provided by the channel selection engine 222. Accordingly, communications on the local network may be configured for optimal bandwidth allocation, transmission speeds, signal quality, etc., without interferences within the shared frequency spectrum range 124. According to an aspect, OPERATION 338 may be performed after OPERATION 334 to prevent possible interferences if the channel configuration determination includes usage of the DOCSIS® extended frequency range 120.

Figure 4:
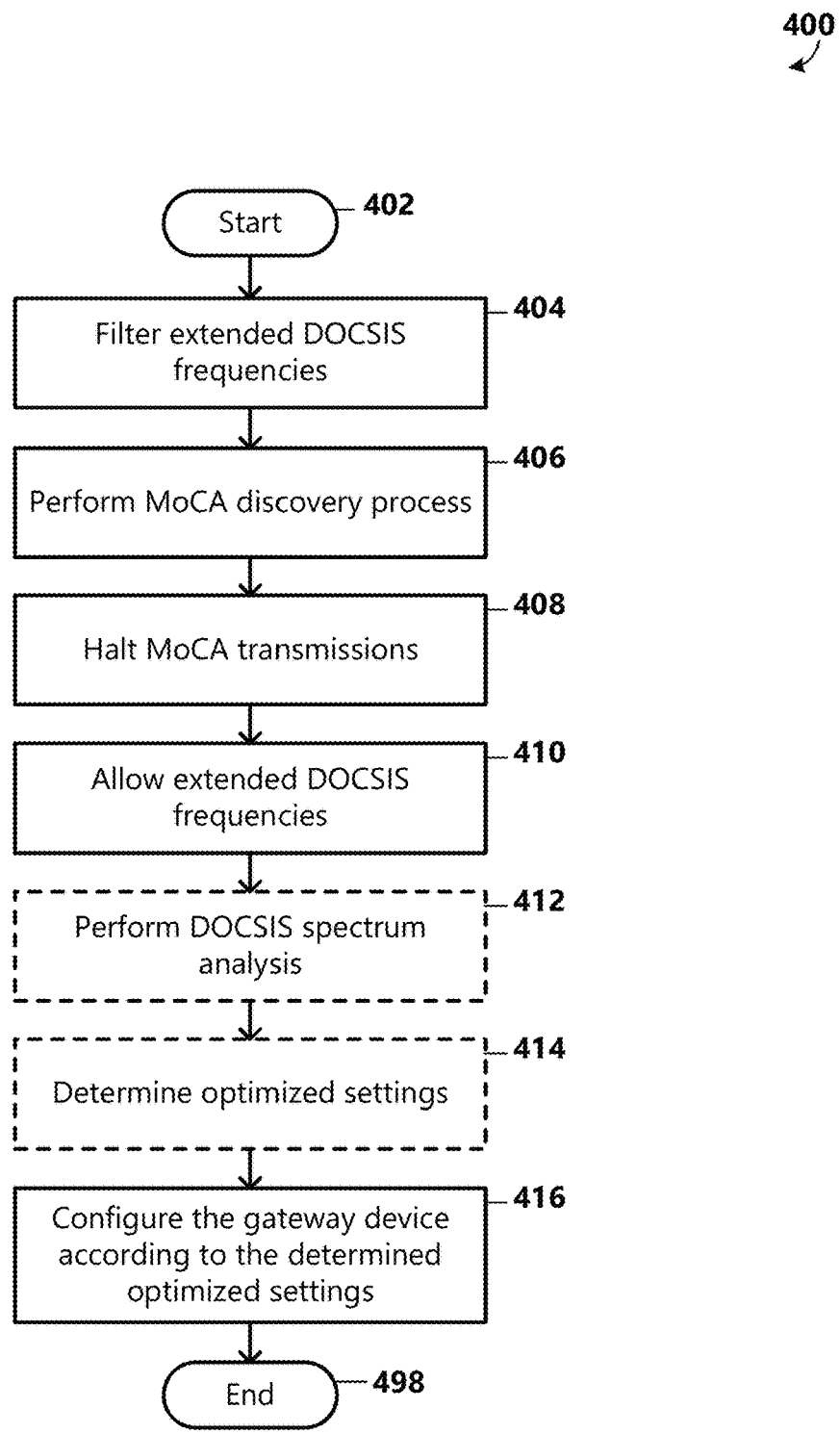
FIG. 4 is a flow diagram depicting more detailed stages of an example process for providing automated communications channel selection according to an embodiment.

FIG. 4 is a flow chart depicting general stages of an example process or method 400 for providing automated communication channel selection according to an embodiment. The method 400 starts at OPERATION 402 that triggers the automated channel selection process. For example, OPERATION 402 may include receiving an indication of a triggering event, such as one or more of: when a new installation of service and/or a gateway device 112 is provided to a subscriber 108, when a new MoCA® node 232 is discovered, an actuation of a button on the gateway device 112, a user command received via a user interface (UI) provided by the gateway device 112, an instruction from the service provider head end 202 (which may be associated with a subscription or billing change, as part of a self-installation procedure, or other triggering event), etc.

At OPERATION 404, instructions may be provided by the channel selection engine 222 to the frequency filter 226 to block signals above a particular cutoff frequency, and in response, the frequency filter 226 may block signals above the particular cutoff frequency to prevent possible interferences between communications received via the HFC network 228 that are within at least a portion of the DOCSIS® extended frequency range 120 and MoCA® transmissions on the local network.

At OPERATION 406, a MoCA® discovery process may be performed where the gateway device 112 may transmit a beacon message to MoCA® nodes 232 and receive responses to the beacon message that include information about the MoCA® nodes 232, such as the types of MoCA® nodes 232 that are on the second communications network 206, the version of MoCA® (i.e., which MoCA® protocol(s)) that the nodes support, the MoCA® frequency spectrum range 122 usages by the nodes, data rates between MoCA® nodes 232 (which may vary depending on the physical characteristics of the path between the transmit and receive nodes), etc. At OPERATION 406, the spectrum analyzer 224 may scan the MoCA® frequency range 122 for signal utilization. OPERATION 406 may further include a communication of the MoCA® network topology data and spectrum usage data to the channel selection engine 222.

At OPERATION 408, the MoCA® module 220 may be instructed to (e.g., by the channel selection engine 222), and in response to the instruction, halt MoCA® transmissions for a defined time period.

At OPERATION 410, the frequency filter 226 may receive an instruction from the channel selection engine 222 to allow all frequencies to pass. In response, the frequency filter 226 may be reconfigured as an all-pass filter to allow all frequencies (e.g., access network signals within the legacy DOCSIS® frequency range 118 and the extended frequency range 120) to be passed to devices 214 connected to the gateway device 112. In some examples, if no MoCA® nodes 232 are discovered operating on the local network 106, OPERATIONS 412 and 414 may be omitted, and the method 400 may proceed to OPERATION 416, where the channel selection engine 222 may instruct the gateway device 112 to deactivate the MoCA® module 220.

When MoCA® nodes 232 are discovered, at OPERATION 412, the spectrum analyzer 224 may receive an instruction from the channel selection engine 222 to perform a spectrum analysis of the DOCSIS® spectrum for determining the DOCSIS® frequencies in use. In response to the instruction, the spectrum analyzer 224 may scan across all DOCSIS® frequencies or a band of defined frequencies passing through the extended spectrum modem 216 of the gateway device 112 and detect and report, to the channel selection engine 222, the RF signals in use.

At OPERATION 414, an optimized channel configuration may be determined by the channel selection engine 222 based on an analysis of the MoCA® network 230 topology, usage of the DOCSIS® frequencies, machine-learned data, and one or more business rules, wherein the channel configuration determination may include: a determination whether to use the DOCSIS® extended frequency range 120 for content delivery to end devices 214, to use the MoCA® network 230 for delivery, or whether to use a particular channel of the DOCSIS® extended frequency range 120 and a particular channel of the MoCA® frequency range 122 that do not interfere with each other. In some examples, the channel configuration determination may provide for frequency selections that enable optimal usage of the DOCSIS® extended frequency range 120 and the MoCA® frequency range 122 and also avoid conflicting communications within the shared frequency spectrum range 124.

At OPERATION 416, the determined optimized channel configuration may be provided to the MoCA® module 220 and the frequency filter 226. In some examples, in response to the determined optimized channel configuration, the MoCA® module 220 may be deactivated. In some examples, in response to the determined optimized channel configuration, the MoCA® module 220 may reestablish communications on the MoCA® network 230 for notifying MoCA® nodes 232 to not dynamically select another channel from which to operate and to use a particular range of frequencies that may allow for high speed data transmissions using the MoCA® network 230 without conflicts with DOCSIS® signals in the extended frequency range 120. In some examples, in response to the determined optimized channel configuration, the frequency filter 226 may be reconfigured as an all-pass filter that enables all frequencies (e.g., access network signals within the legacy DOCSIS® frequency range 118 and the extended frequency range 120) to be passed to the devices 214 connected to the gateway device 112 or as a low-pass or band-pass filter that limits certain DOCSIS® channels (e.g., within the shared frequency spectrum range 124) from being used that may interfere with a MoCA® channel operating within the shared frequency spectrum range 124. The method 400 ends at OPERATION 498.

Figure 5:
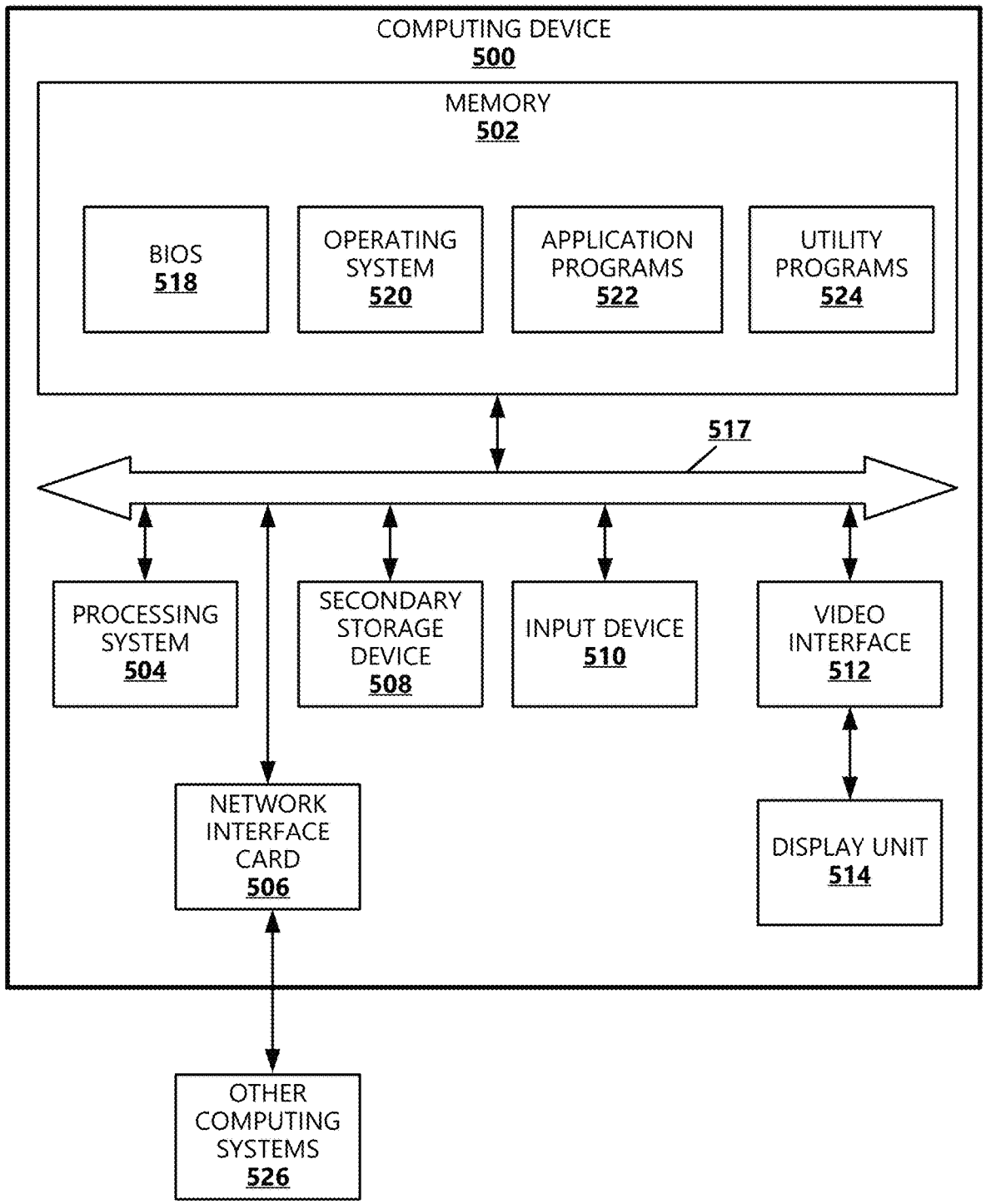
FIG. 5 is a block diagram illustrating example physical components of a computing device or system with which embodiments may be practiced.

FIG. 5 is a block diagram illustrating example physical components of a computing device 500 or system (e.g., ACCS system 110) with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface card 506 (wired and/or wireless), a secondary storage device 508, an input device 510, a video interface 512, a display unit 514, and a communication medium 517. In other embodiments, the computing device 500 may be implemented using more or fewer hardware components (e.g., a video interface, a display unit, or an input device) or in combination with other types of computer systems 526 and program modules.

The memory 502 includes one or more computer-readable storage media capable of storing data and/or computer-executable instructions. Memory 502 may store the computer-executable instructions that, when executed by a processor or processing unit of the processing system 504, cause operations, such as the operations described above with respect to FIGS. 3A, 3B, and 4) to provide automated channel selections. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units (e.g., one or more processors), which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 517 facilitates communication among the hardware components of the computing device 500. In different embodiments, the communications medium 517 facilitates communication among different components of the computing device 500. For instance, in the example of FIG. 5, the communications medium 517 facilitates communication among the memory 502, the processing system 504, the network interface card 506, the secondary storage device 508, the input device 510, and the video interface 512. In different embodiments, the communications medium 517 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 6:
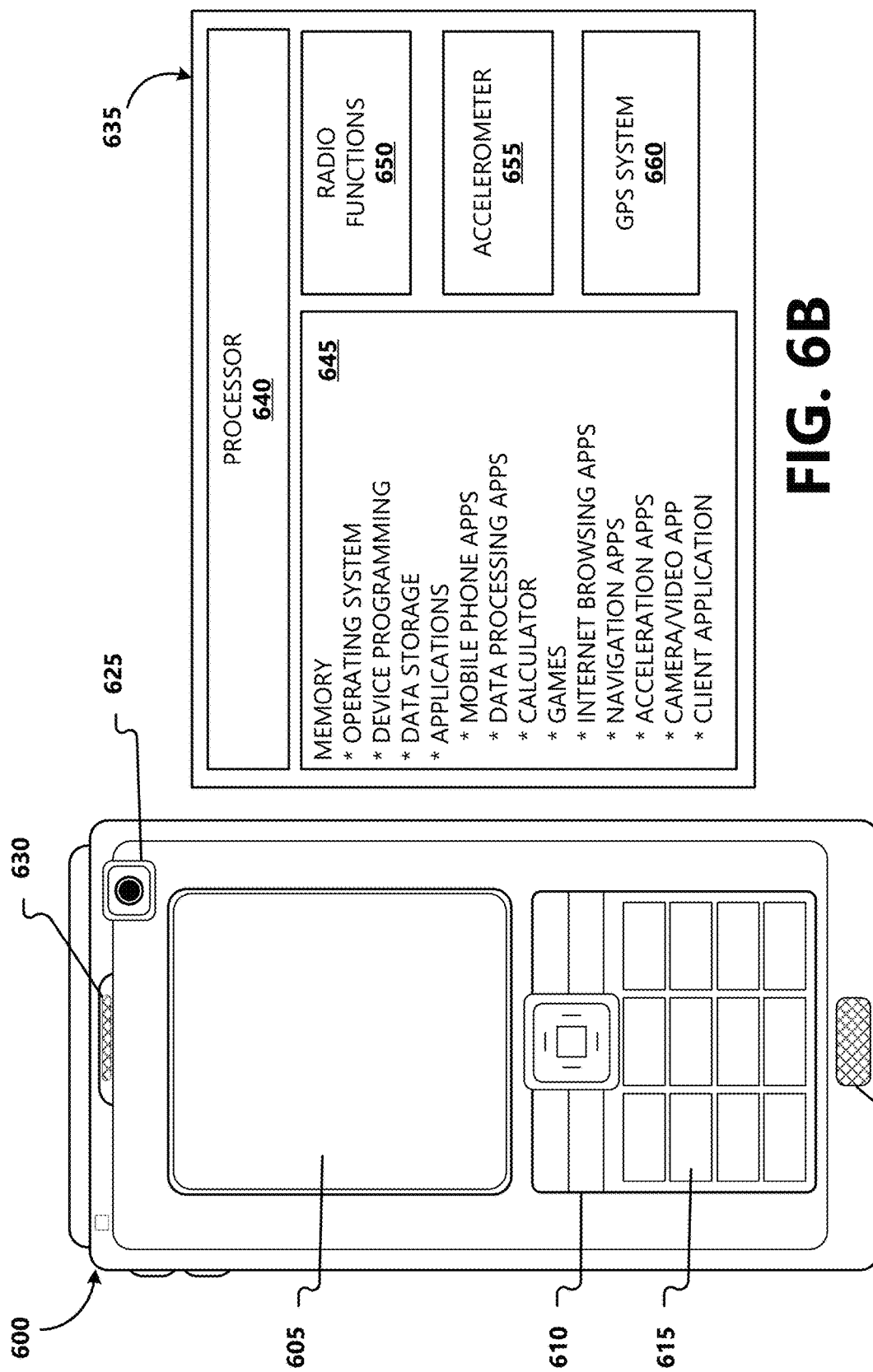
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other client device with which aspects can be practiced. The mobile computing device 600 is illustrative of any suitable device operative to send, receive and process wireless communications. Referring now to FIG. 6A, a display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Figure 7:
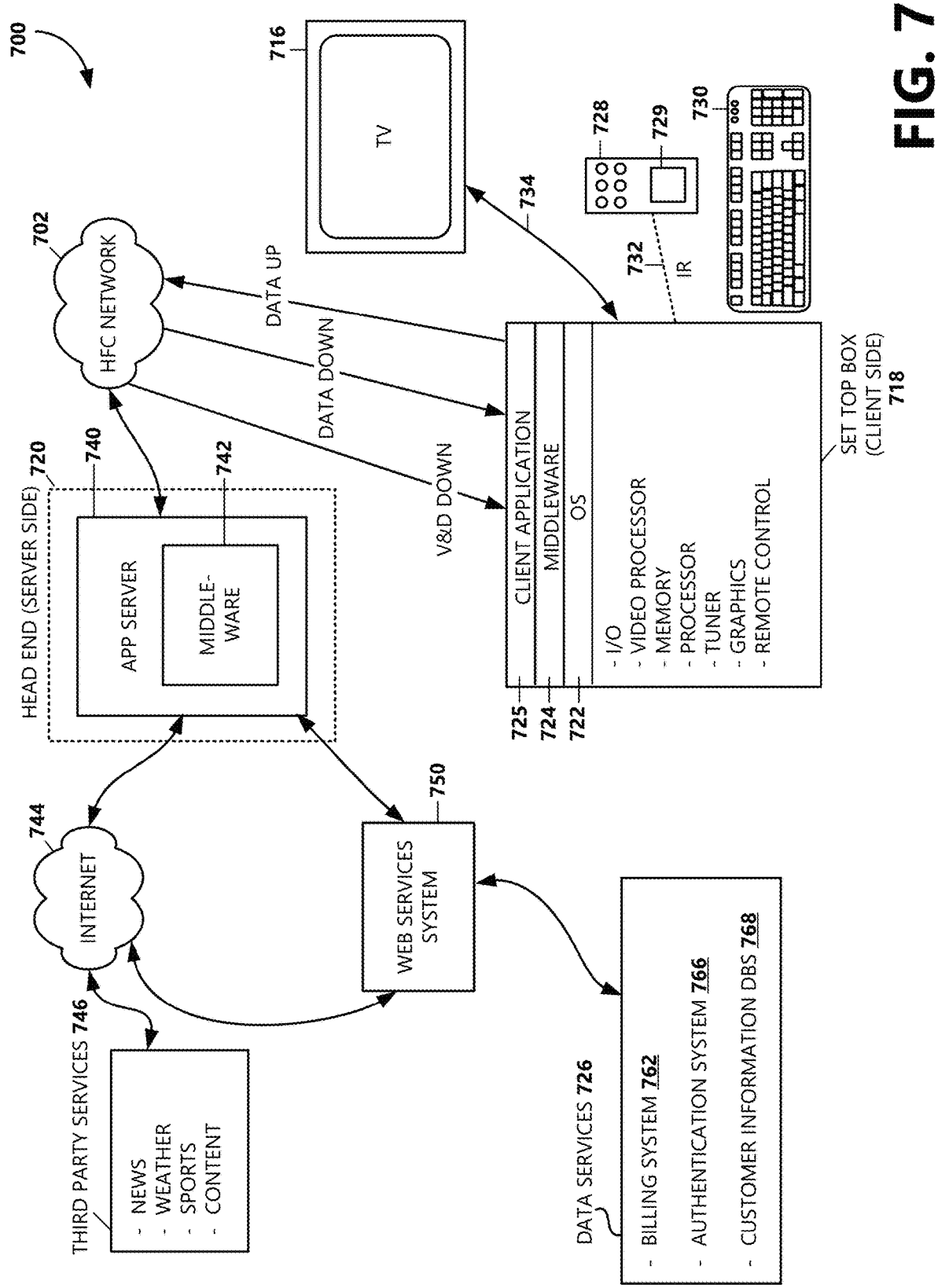
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. According to aspects, the service provider 102 may operate in the form of a CATV 700 as illustrated and described in FIG. 7. As should be appreciated, a CATV services system 700 is but one of various types of systems that can be utilized for providing an operating environment for providing supplemental content functionality described herein. Referring now to FIG. 7, digital and analog video programming, information content and interactive television services are provided via a HFC network 702 to a television set 716 for consumption by a cable television/services system customer. As is known to those skilled in the art, HFC networks 702 combine both fiber optic cable lines and coaxial cable lines. Typically, fiber optic cable lines run from the cable head end 720 to neighborhoods of subscribers. Coaxial cable lines run from the optical fiber feeders to each customer or subscriber.

The CATV system 700 is in the form of a distributed client-server computing system for providing video and data flow across the HFC network 702 between server-side services providers (e.g., cable television/services providers), such as video content feed provider 102a, via a server-side head end 720 and a client-side customer via a set-top box (STB) 718 functionally connected to a customer receiving device, such as the television set 716. The functionality of the HFC network 702 allows for efficient bidirectional data flow between the set-top box 718 and an application server 740 of the server-side head end 720. As is understood by those skilled in the art, modern CATV systems 700 can provide a variety of services across the HFC network 702 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 702 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end 720, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 702 through a video/data downlink and data via a data downlink. The STB 718 can transmit data from the client side of the CATV system 700 to the server side of the CATV system 700 via the HFC network 702 via one data uplink. The video/data downlink is an "in band" downlink that allows for digital and analog video and data signaling from the server side of the CATV system 700 through the HFC network 702 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 702 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 702 to the STB 718. Operation of data transport between components of the CATV system 700, described with reference to FIG. 7, is well known to those skilled in the art.

Referring still to FIG. 7, the head end 720 of the CATV system 700 is positioned on the server side of the CATV system and includes hardware and software systems responsible for originating and managing content for distributing through the HFC network 702 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 702. As described above, the application server 740 includes a middleware layer 742 for processing and preparing data from the head end 720 of the CATV system 700 for receipt and use by the client-side STB 718. For example, the application server 740 via the middleware layer 742 can obtain supplemental content from third-party services 746 via the Internet 744 for transmitting to a customer through the HFC network 702, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 702 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 702 and the STB 718. Additionally, the application server 740 may receive data via the Internet 744.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt. An authentication system 766 can include information such as secure user names, subscriber profiles, subscriber IDs, and passwords utilized by customers for access to network services. A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing automated communication channel selection, the system comprising:
   at least one processor;
   a memory coupled to the at least one processor, the memory including instructions that when executed by the at least one processor cause the system to be operable to:
   block signals of a first network within a defined frequency range, wherein the defined frequency range includes a range of frequencies that are configured for use for signals of the first network and for signals of a second network;
   perform a scan of the second network to obtain network topology data associated with the second network;
   halt transmissions of signals on the second network;
   allow all frequency signals of the first network to pass;
   perform a spectrum analysis of the first network to obtain frequency utilization data of signals on the first network;
   analyze the topology data associated with the second network and the frequency utilization data of signals of the first network;
   based on the analysis of the topology data associated with the second network and the frequency utilization data of signals of the first network and one or more business rules, determine an optimal channel configuration for the first network and the second network; and
   control transmissions of the first network and the second network based on the optimal channel configuration, wherein in controlling the transmissions, frequency signals of the first network do not overlap with frequency signals of the second network.

2. The system of claim 1, wherein:
   the first network is a Data over Cable System Interface Specification (DOCSIS) network utilizing a legacy frequency range and an extended frequency range;
   the second network is a Multimedia over Coaxial Alliance (MOCA) network; and
   the range of frequencies that are configured for use for signals of the first network and for signals of the second network include at least a portion of the extended frequency range utilized by the DOCSIS network.

3. The system of claim 2, wherein the one or more business rules includes a rule associated with determining a channel configuration that enables utilization of at least a portion of the extended frequency range by the first network based on a subscription type.

4. The system of claim 2, wherein the one or more business rules includes a rule associated with determining a channel configuration that enables utilization, by the second network, of at least a portion of a frequency range associated with the second network based on a signal type.

5. The system of claim 4, wherein the signal type includes Internet Protocol video data.

6. The system of claim 2, wherein the system is further configured to:
   based on the frequency utilization data of signals of the first network, determine a point of entry filter is installed on the first network, wherein the point of entry filter blocks at least a portion of the extended frequency range provided by the DOCSIS access network;
   block transmissions on the first network above the legacy frequency range; and
   provide a notification to a service provider associated with the first network to remove the point of entry filter.

7. The system of claim 2, wherein in controlling transmissions of the first network and the second network, the system is configured to one of:
   continue to halt transmissions of signals on the second network; and
      allow transmissions on the first network to operate within the legacy frequency range and the extended frequency range;
   allow transmissions of signals on the second network using one or more channels that utilize frequencies above a starting point of the extended frequency range; and
      block transmissions on the first network above the legacy frequency range; or
   allow transmissions of signals on the second network using one or more channels within a first frequency range; and
      allow transmissions of signals on the first network to operate within the legacy frequency range and a second frequency range, wherein the second frequency range includes a portion of the extended frequency range outside of the first frequency range used by the second network.

8. The system of claim 1, wherein the system comprises a configurable filter configured to:
   block signals of the first network within the defined frequency range; and based on the optimal channel configuration, and one of:
      allow transmissions on the first network to operate within the legacy frequency range and the extended frequency range;
      block transmissions on the first network above the legacy frequency range; or
      allow transmissions of signals on the first network to operate within the legacy frequency range and a portion of the extended frequency range using one or more channels that utilize frequencies outside of a frequency range determined for use by the second network.

9. The system of claim 1, wherein the system comprises a machine learning engine configured to:
   continually receive topology data associated with the second network and frequency utilization data of signals of the first network;
   learn, from the received topology data and frequency utilization data, data usage behaviors; and
   use the learned data usage behaviors as part of determining the optimal channel configuration.

10. The system of claim 1, wherein the topology data associated with the second network include:
    identifying information about one or more devices connected to the second network;
    a protocol version supported by the one or more devices; and
    data rates between the one or more devices.

11. The system of claim 1, wherein to halt transmissions of signals on the second network, the system is configured to notify the one or more devices to halt Multimedia over Coaxial Alliance (MOCA) signal transmissions.

12. A method of providing automated communication channel selection, comprising:
    blocking signals of a first network within a defined frequency range, wherein the defined frequency range includes a range of frequencies that are configured for use for signals of the first network and for signals of a second network;

performing a scan of the second network to obtain network topology data associated with the second network;

halting transmissions of signals on the second network;

allowing all frequency signals of the first network to pass;

performing a spectrum analysis of the first network to obtain frequency utilization data of signals on the first network;

analyzing the topology data associated with the second network and the frequency utilization data of signals of the first network;

based on the analysis of the topology data associated with the second network and the frequency utilization data of signals of the first network and one or more business rules, determining an optimal channel configuration for the first network and the second network; and controlling transmissions of the first network and the second network based on the optimal channel configuration, wherein in controlling the transmissions, frequency signals of the first network do not overlap with frequency signals of the second network.

13. The method of claim 12, wherein blocking signals on the first network within the defined frequency range comprises:

blocking Data over Cable System Interface Specification (DOCSIS) network signals in an extended frequency range, wherein the extended frequency range overlaps at least a portion of a frequency range used by a Multimedia over Coaxial Alliance (MOCA) network; and allowing DOCSIS network signals in a legacy frequency range to pass.

14. The method of claim 13, wherein controlling transmissions of the first network and the second network based on the optimal channel configuration comprises one of:

continuing to halt MOCA transmissions of MOCA signals on the second network; and allowing transmissions on the first network to operate within the legacy frequency range and the extended frequency range;

allowing transmissions of MOCA signals on the second network using one or more channels that utilize frequencies above a starting point of the extended frequency range; and blocking transmissions on the first network above the legacy frequency range; or allowing transmissions of signals on the second network; and allowing transmissions of signals on the first network to operate within the legacy frequency range and a portion of the extended frequency range using one or more channels that utilize frequencies outside of a frequency range determined for use for MOCA signals on the second network.

15. The method of claim 12, wherein determining the optimal channel configuration comprises applying a business rule, included in the one or more business rules, associated with determining a channel configuration that enables utilization of at least a portion of the extended frequency range by the first network based on a subscription type.

16. The method of claim 12, wherein determining the optimal channel configuration comprises applying a business rule, included in the one or more business rules, associated with determining a channel configuration that enables utilization, by the second network, of at least a portion of a frequency range associated with the second network based on a signal type.

17. A gateway device comprising:
an extended spectrum modem operatively connected to a frequency filter;
a multimedia over coaxial network module;
a channel selection engine;
a spectrum analyzer;
at least one processor;
a memory communicatively connected to the at least one processor, the memory storing instructions which, when executed, cause the gateway device to:
via the frequency filter, block signals of a first network within a defined frequency range, wherein the defined frequency range includes a range of frequencies that are configured for use for signals of the first network and for signals of a second network;
via the multimedia over coaxial network module, perform a discovery process to obtain network topology data associated with the second network;
via the multimedia over coaxial network module, halt transmissions of signals on the second network;
via the frequency filter, allow all frequency signals of the first network to pass;
via the spectrum analyzer perform a spectrum analysis of the first network to obtain frequency utilization data of signals on the first network;
via the channel selection engine:
analyze the topology data associated with the second network and the frequency utilization data of signals of the first network; and
based on the analysis of the topology data associated with the second network and the frequency utilization data of signals of the first network and one or more business rules, determine an optimal channel configuration for the first network and the second network; and
via the frequency filter and the multimedia over coaxial network module, control transmissions of the first network and the second network, respectively, based on the optimal channel configuration, wherein in controlling the transmissions, frequency signals of the first network do not overlap with frequency signals of the second network.

18. The gateway device of claim 17, wherein in controlling transmissions of the first network and the second network, the instructions cause one of:

the multimedia over coaxial network module to continue to halt transmissions of signals on the second network; and the frequency filter to allow transmissions on the first network to operate within the legacy frequency range and the extended frequency range;

the multimedia over coaxial network module to allow transmissions of signals on the second network using one or more channels that utilize frequencies above a starting point of the extended frequency range; and the frequency filter to block transmissions on the first network above the legacy frequency range; or the multimedia over coaxial network module to allow transmissions of signals on the second network within a portion of the extended frequency range; and the frequency filter to allow transmissions of signals on the first network to operate within the legacy frequency range and a portion of the extended frequency range outside of the portion of the extended frequency range used by the second network.

19. The gateway device of claim 17, wherein the one or more business rules include:
- a rule associated with determining a channel configuration that enables utilization of at least a portion of the extended frequency range by the first network based on a subscription type; and
- a rule associated with determining a channel configuration that enables utilization, by the second network, of at least a portion of a frequency range associated with the second network based on a signal type.

20. The gateway device of claim 17, wherein the channel selection engine is a machine learning engine configured to:
- continually receive topology data associated with the second network and frequency utilization data of signals of the first network;
- learn, from the received topology data frequency utilization data, data usage behaviors; and
- use the learned data usage behaviors as part of determining the optimal channel configuration.

* * * * *